United States Patent [19]
Sussman

[11] Patent Number: 5,641,289
[45] Date of Patent: Jun. 24, 1997

[54] TEACHING AND ADVERTISING TOOL

[76] Inventor: Martin Victor Sussman, 1361 Mass. Ave., Lexington, Mass. 02173

[21] Appl. No.: 447,269

[22] Filed: May 22, 1995

[51] Int. Cl.⁶ .................................................... G09B 19/00
[52] U.S. Cl. .......................... 434/236; 283/46; 434/365; 434/433
[58] Field of Search .................. 434/236, 365, 434/428, 178, 433; 40/427; 283/45, 46, 56, 44

[56] References Cited

U.S. PATENT DOCUMENTS

| | | | |
|---|---|---|---|
| 1,533,437 | 4/1925 | Macy | 434/433 X |
| 1,592,034 | 7/1926 | Macy | 283/45 |
| 2,125,871 | 8/1938 | Austin | 434/433 |
| 2,283,777 | 5/1942 | Wendling | 40/427 X |
| 2,397,272 | 3/1946 | Land | 40/427 X |

FOREIGN PATENT DOCUMENTS 702395  4/1931  France ..................... 40/427

*Primary Examiner*—Cary E. O'Connor
*Assistant Examiner*—Jeffrey A. Smith

[57] ABSTRACT

Tool for enhancing interest in and memory retention of visual alphanumeric text message presentations comprising arrays of a multiplicity of immediately visible and comprehensible text messages that are readable both as conventional two-dimensional printed text messages and as perceived three-dimensional text messages with component words floating in space at various distances from the viewer, through stereoscopic parallax. Methods for preparing such a tool and its constituent text-forms, and arrays.

7 Claims, 6 Drawing Sheets

```
THIS IS    THIS IS    THIS IS    THIS IS    THIS IS    THIS IS    THIS IS
   A          A          A          A          A          A          A
  3-D        3-D        3-D        3-D        3-D        3-D        3-D
 "VERTI     "VERTI     "VERTI     "VERTI     "VERTI     "VERTI     "VERTI
  GON"!      GON"!      GON"!      GON"!      GON"!      GON"!      GON"!
  (tm)       (tm)       (tm)       (tm)       (tm)       (tm)       (tm)
```

| THIS IS | THIS IS | THIS IS | THIS IS | THIS IS | THIS IS | THIS IS |
|---------|---------|---------|---------|---------|---------|---------|
| A | A | A | A | A | A | A |
| 3-D | 3-D | 3-D | 3-D | 3-D | 3-D | 3-D |
| "VERTI | "VERTI | "VERTI | "VERTI | "VERTI | "VERTI | "VERTI |
| GON" | GON" | GON" | GON" | GON" | GON" | GON" |
| (tm) | (tm) | (tm) | (tm) | (tm) | (tm) | (tm) |

FORD FORD FORD FORD FORD FORD FORD
IS    IS    IS    IS    IS    IS    IS
WAY WAY WAY WAY WAY WAY WAY
OUT  OUT  OUT  OUT  OUT  OUT  OUT

FRONT FRONT FRONT FRONT FRONT FRONT

Figure 6

TEACHING AND ADVERTISING TOOL

This invention relates to improved tools used for teaching and advertising purposes said tools containing visual text arrays, forms of text, and word message forms, that engage readers more strongly than conventionally printed text and enhance retention in memory of the text message and content. The invention is an object containing arrays of text that are reproduced on flat surfaces and that can be read as conventional printed text, but in addition the text content of this invention appear as forceful and engaging three-dimensional text messages with component words appearing at various distances from the viewer when viewed in a manner that will be described herein. Mechanical or optical aids are not needed to achieve the 3-dimensional effect. This invention also pertains to methods for preparing such devices and their constituent text-forms, and arrays.

It is known that the human brain is able to perceive objects in 3-dimensions when different images of such objects, stereoscopically or pseudoscopically displaced from each other or exhibiting stereoscopic or pseudoscopic displacement or parallax, are presented separately and simultaneously to a viewer's right and left eye. It is this ability that makes effective the classical stereoptican viewer and the more recent random-dot stereograms published by N. E. Thing Enterprises, of Massachusetts, and others.

Surprisingly, I have found that viewers of the 3-dimensional text messages of this invention, said invention herein called "VERTIGON"s, experience a pleasant and mild vertigo that promotes a degree of attention and concentration on the text message that greatly enhances the viewer's interest in, and retention in memory, of the printed words presented by the device. Hence, the invention, the "VERTIGON", is particularly effective as posters, billboards, flyers, greeting and business cards, advertising copy, and especially teaching materials, because the invention is a tool or means for conveying a message repeatedly and with great force, while commanding a degree of concentration and attention that is quite unlike other reproduced text materials.

The text of the "VERTIGON" is always readable, and hence accessible to casual viewer or the viewer incapable of depth perception. The message of the text is not hidden. The pleasantness and excitement of the 3-dimensional effect, however, entices the viewer capable of depth perception to spend much more time with the textual message than would occur with conventionally reproduced messages. The viewer of the "VERTIGON" stereographic-text generally is not passive or casual about the text but becomes actively involved with the text.

The invention presents stereoscopically or pseudoscopically displaced images to the viewer as special arrays of text, words, numbers, syllables, or phrases that combine to form a 3-dimensional text message. The unexpected result of presenting text messages in this manner is that said messages command much more attention and interest and, most importantly, are retained in memory more readily than conventional presentations of text messages. The stereographic-texts are not composed of random dots or abstract patterns but of horizontal arrays of identical words, syllables, or phrases and the message content and text of the invention (the "V E R T I G O N") is always visible, readable and accessible, whereas the content or image of the random-dot stereogram is hidden and is accessible and perceived only by viewers who are capable of depth-perception and have binocular vision.

An additional important feature of this invention (the "V E R T I G O N") is that it can be used to create very large, always readable, text messages, for example, messages that are poster-size, life size, or even billboard size, that can be 3-dimensionally perceived without supplementary mechanical or optical assistance, devices, or means.

In the drawings:

FIG. 1 is an example of this invention object presenting an alphanumeric text message in both a two-dimensional state and a perceived three-dimensional state;

FIG. 5 is an example of this invention object for use as a teaching tool;

FIG. 6 is an example of this invention object for use as an advertising tool.

Further in these drawings,

FIG. 1 is a "V E R T I G O N" whose text message reads vertically: This is a 3-D "V E R T I G O N"! (tm). The individual word components of this message are each repeated 7 to 8 times in each horizontal row with a horizontal displacement or repeat distance that is constant in each row, but changes from horizontal row to row. The same word or phrase lies on each horizontal line of text. The repeat distance difference from row to row provides the stereoscopic parallax that creates the perception of 3-dimensions. Each horizontal row of words will appear to float in space at a different depth or distance from the viewer, when the entire text is viewed so that the point of convergence of the lines of sight of the right and left eye is in front of, or beyond, the plane of the printed page, as illustrated in FIGS. 2 and 3.

Figure 2:
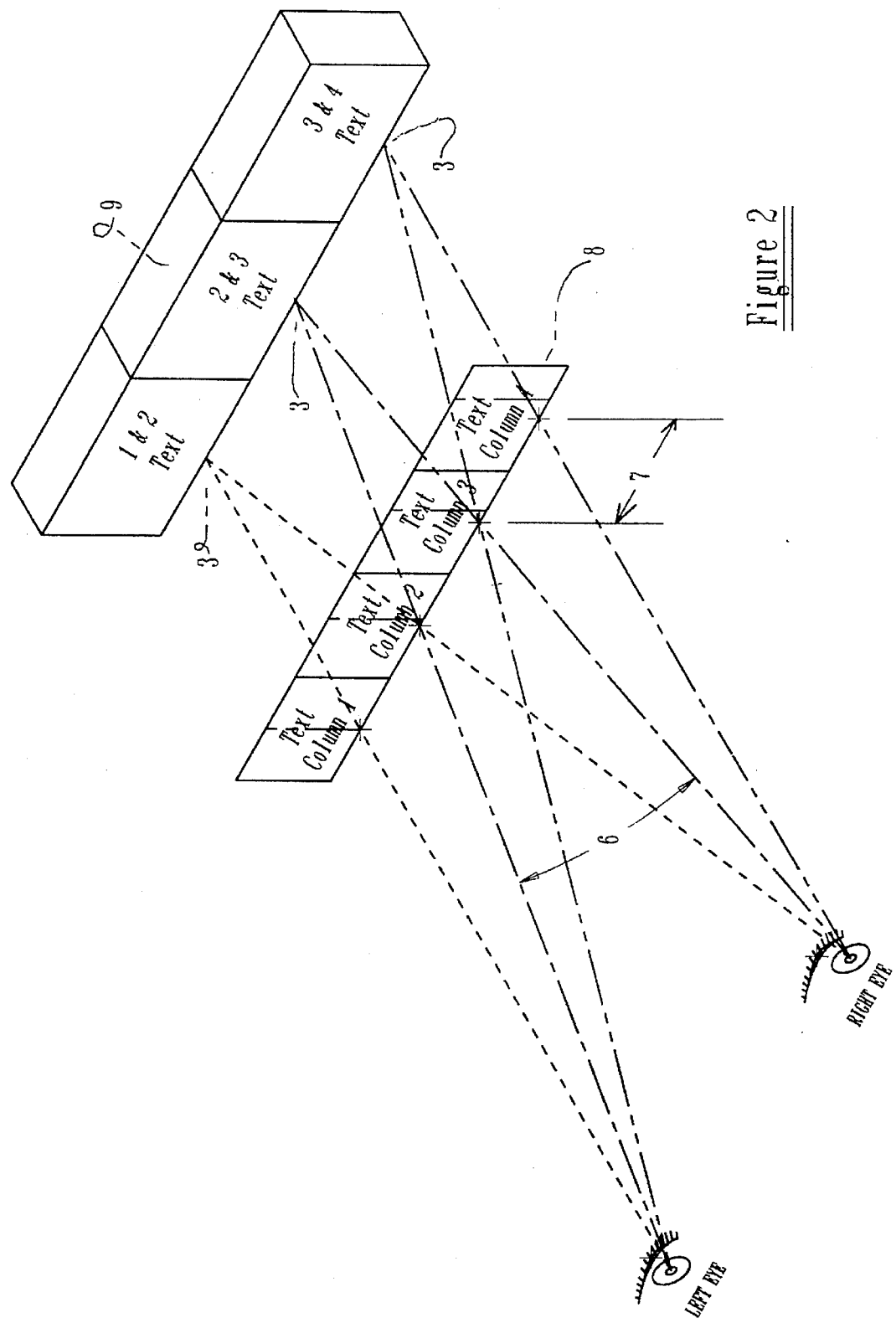
FIG. 2 illustrates the perception mechanism for line of sight convergence beyond the object plane.

FIG. 2 illustrates the perception achieved with line of sight convergence point (3) beyond the plane of the object (8), with the perceived image (9) situated at convergence point (3).

Figure 3:
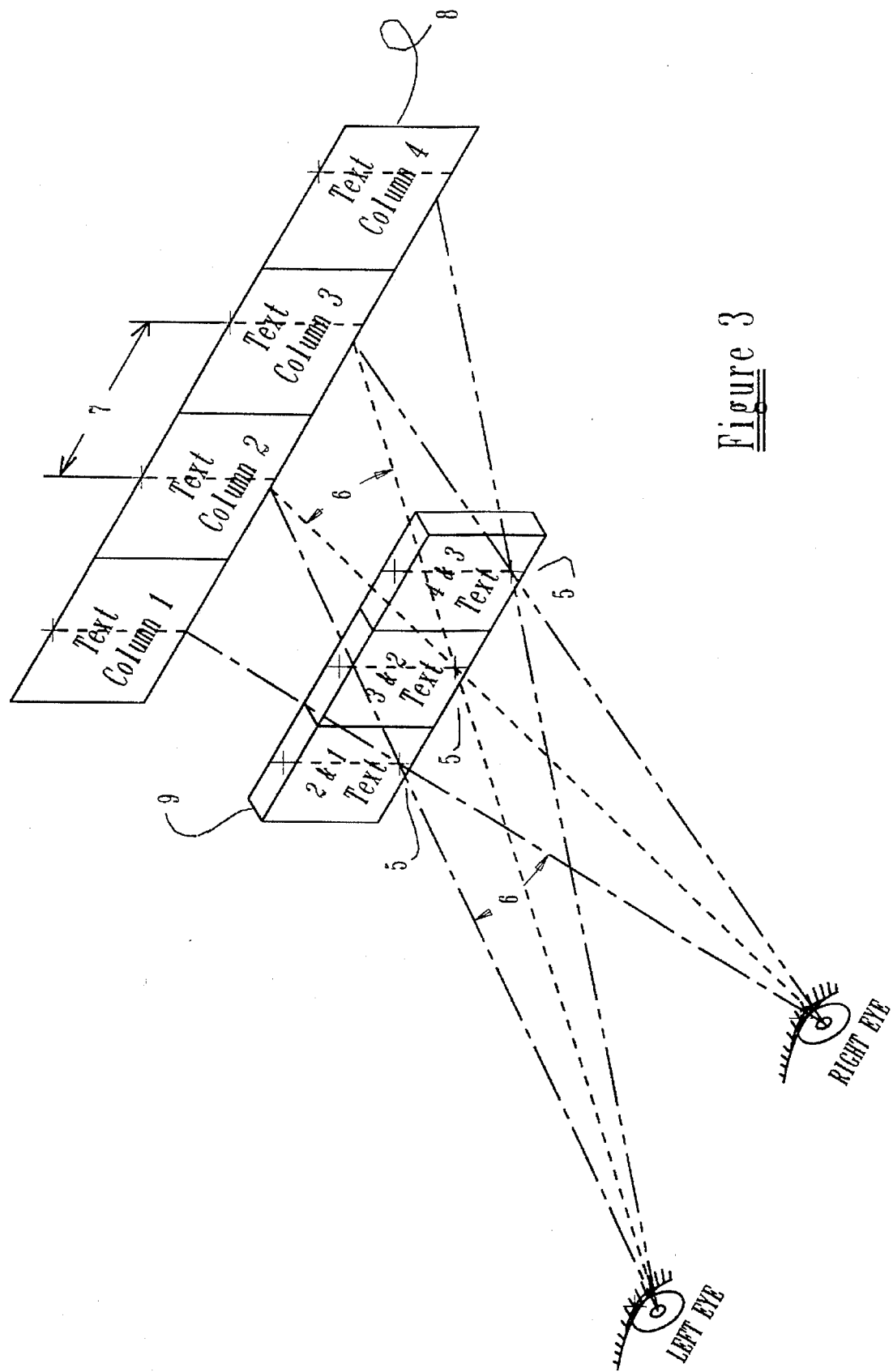
FIG. 3 illustrates the perception mechanism for line of sight convergence before the object plane.

FIG. 3 shows the perception achieved with line of sight convergence point (5) in from of the plane of the object (8). Words are perceived at various distances above the plane of the printed text and extend toward the viewer when the convergence point of the lines of sight is in front of the plane of the actual printed text.

Figure 4:
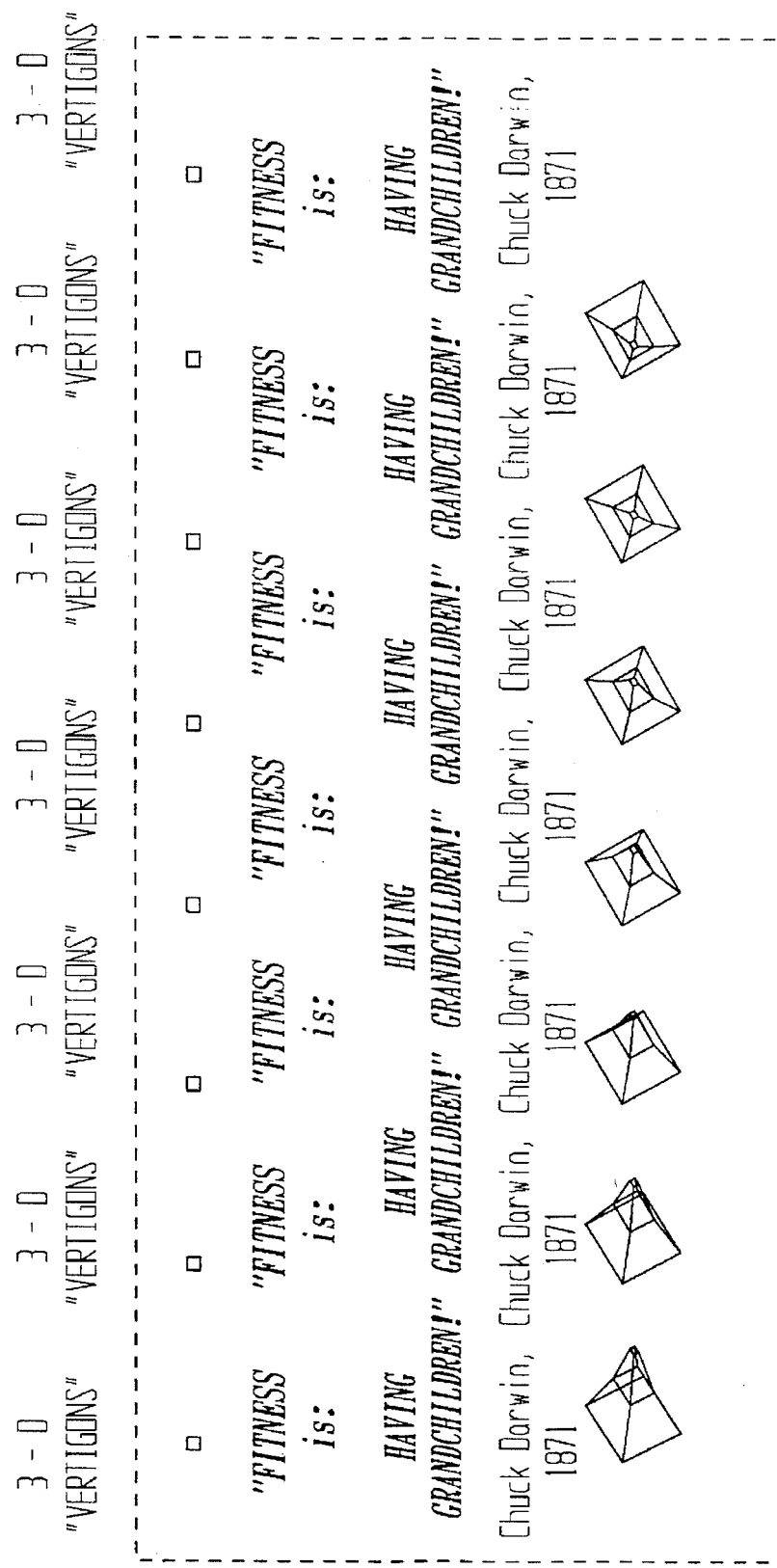
FIG. 4 is another example of this invention object presenting an alphanumeric text message accompanied by an illustration.

FIG. 4 is a "VERTIGON" that is accompanied by an illustration, in this instance, of a 3-dimensional pyramid-like tower.

Figure 5:
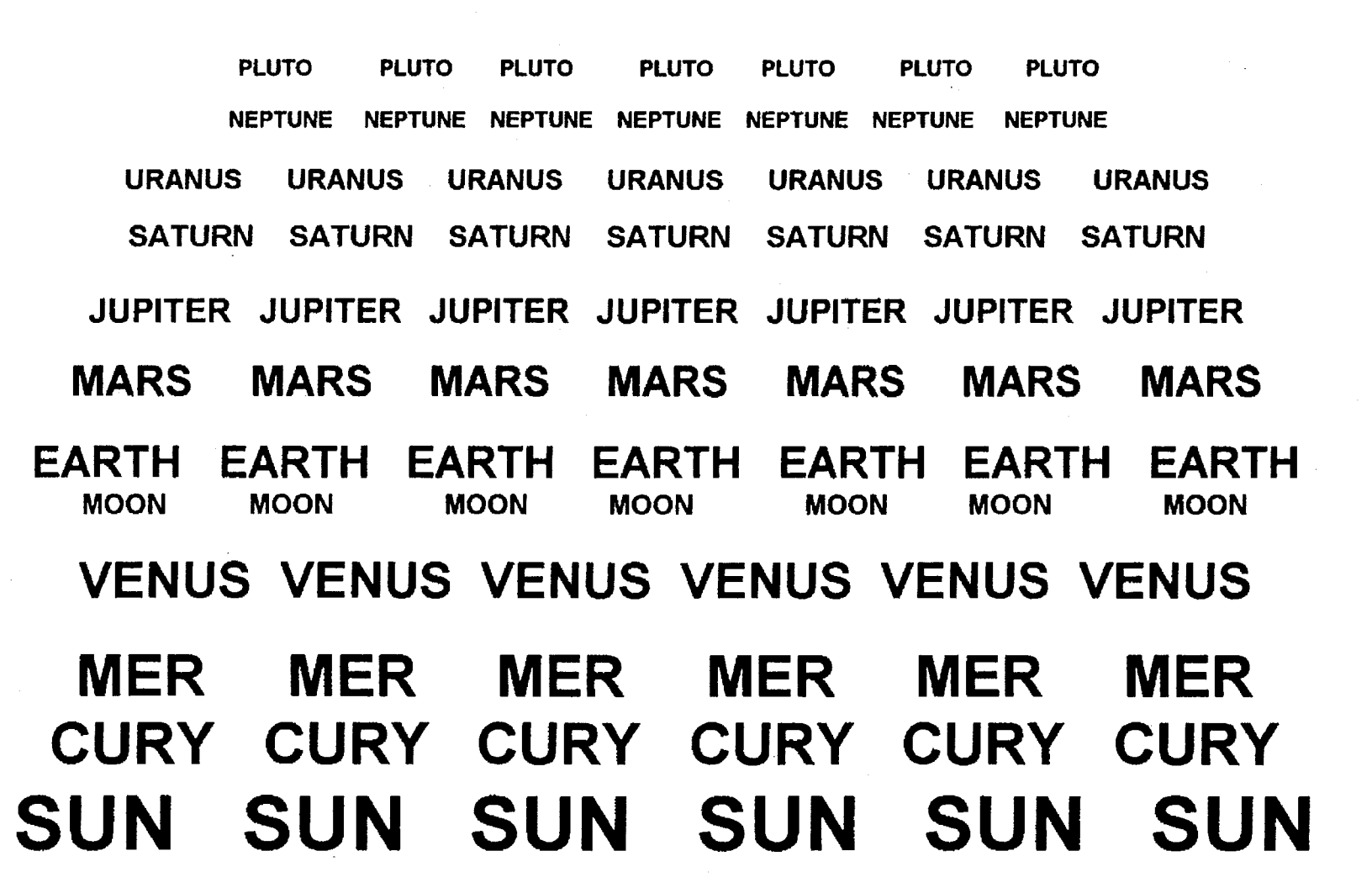

FIG. 5 is an example of a "VERTIGON" stereographic-text object that names the Sun and the planets of the Solar System in the order of their distance from the Sun, and is used as a teaching tool. The horizontal displacement, or horizontal distance between the start of each planet name, changes from horizontal row to horizontal row and reaches a minimum at Pluto. The word "MOON" has a horizontal displacement that is not constant on the same horizontal line, but alternates from slightly greater than to slightly less than the uniform horizontal displacements of the word "EARTH". This example of a "VERTIGON" is best viewed with the line of sight convergence in front of the text plane, in which case the planet names will be perceived as receding from the Sun as if they were printed on the risers of an ascending stairway and the Moon will alternately appear in front of and beyond the Earth.

FIG. 6 is an example of a "VERTIGON" stereographic-text object that may be used for advertising and that was employed in a test of the interest and attention commanded by "VERTIGON"s. The test is described below. This particular example of a "VERTIGON" is most effective when viewed with the line of sight convergence in front of the text plane so that the word "FORD" is perceived closest to the viewer.

The number of horizontally adjacent words in a "VERTIGON" can vary between 2 and an indefinitely large number, as when the "V E R T I G O N" stereographic-text object is used as a mural or frieze on a horizontally extended vertical surface. For use on a letter-size printed page or small poster the preferred number of horizontally adjacent identical words is between 3 and 16, with horizontally adjacent words displaced from each other a distance, (7), such that the internal angle [6], subtended by the right and left eye lines of sight at a convergence point, (5), in front of the actual image plane, (8), is between 2 degrees and 10 degrees, with a preferred angle of about 5.7 degrees.

"VERTIGON"s generally consist of a multiplicity of rows of horizontally repeated identical words, numbers, syllables, or short phrases. The words, numbers, syllables, or phrases generally differ from row to row and are horizontally and differentially spaced-apart to emulate stereoscopic or pseudoscopic parallax, and constitute a printed textual message when the word of each row is read in vertical sequence. The text message is not hidden and is immediately visible and comprehensible. The words of the message, however, are perceived to float in space in 3-dimensions as if different parts of the text were located on different transparent planes at different distances from the viewer when the point of convergence of the viewer's line of sight lies either in front of or beyond the actual plane of the printed text.

To perceive the 3-dimensional effect, the viewer holds the stereograhic-text object about 16–24 inches in front of the eyes and stares past the array until any 2 horizontally adjacent words fuse into one. The message will then become 3-dimensional, with words appearing to float in space at different distances from the viewer. Alternatively, the viewer may hold the point of a pencil between 2 horizontally adjacent words and fix his gaze on the pencil point. The pencil point is then moved slowly toward the viewer and away from the printed surface. At a pencil point distance of about 3 to 10 inches from the selected adjacent words they will suddenly appear as one single clearly readable word. After a few seconds at this position the words of the text stereogram will appear to be floating in space and approaching the viewer.

A general method of making "VERTIGON"s is to assign desired perpendicular distances of depth beyond the base plane of the printed surface to the individual letters, words, or phrases that combine in vertical sequence to compose the text message of the "VERTIGON" and subsequently impose a horizontal parallax displacement of each said same letter, word, or phrase, on the horizontally adjacent word, said horizontal displacement corresponding to a shift in viewing angle of 2 degrees to 10 degrees but preferably about 5.7 degrees. The latter choice of viewing angle displacement will impose a linear horizontal displacement of the text of the adjacent word equal to about 0.1 time the assigned perpendicular depth distance of the text. Assigned depth distances of text elements should preferably be between zero and about 15 inches beyond the base plane.

As an illustration of the effectiveness of the "VERTIGON" as a teaching tool and memory retention aid I now describe a test that was performed. Thirty students in a general science class in a local high school were randomly assigned to two groups. The groups were separated and each student was asked to write the names of the planets of the solar system in order of their distance from the Sun. They were told that no grade was attached to their answers but that the correct answers would receive a small prize. No student answered correctly. Only six students in one group and 4 in the other were able to name more than four planets. The students in the latter group were then given the "VERTIGON" of FIG. 5, showing the planet names and order, and were told that the names would leap out in 3-dimensions if they stared at the page correctly. The class was then dismissed and left the room excitedly discussing the proper technique for 3-dimensional viewing and instructing each other in viewing technique and exclaiming as they perceived the 3-dimensional effect.

The students in the former group that was initially slightly more successful in identifying planet names, were given a printout of a single column of the FIG. 5 text that was simply a vertical listing of the planet names and order, and told that was the full answer to the question initially asked. The class was then dismissed and some left the planet list on their chairs.

At the next meeting of the class the entire class was once again asked to name the planets and order the planets. The results were remarkable. The group that had received the FIG. 5 "VERTIGON" produced 10 perfect answers and all but two students named all 9 planets. By contrast the group receiving the single column of information produced only 4 correct answers and only 7 students named nine planets.

In another test to demonstrate increase in interest, one hundred copies of the FIG. 6 "VERTIGON" were placed beside an equal number of copies of a single vertical column of the same text at the entrance to a shopping mall. The copies were watched from a distance to ensure that they were not discarded or removed en-masse. Four hours later the pile of text stereograms had been completely depleted, whereas the pile containing a single column of text was reduced by 5 copies.

Modifications of the present invention will be obvious to those skilled in the art without departing from the spirit thereof.

I claim:

1. A tool for enhancing interest in and memory retention of visual alphanumeric text presentations to a viewer said tool comprising:

a) means for visually displaying alphanumeric text; and b) means on said displaying means for visually presenting to a viewer an alphanumeric text message in both a two-dimensional and a perceived three-dimensional state through stereoscopic parallax, said text message presenting means comprising:

i) a multiplicity of identical text messages each of said text messages comprising sequential components which each comprises at least one character string;

wherein each of said components of each of said identical text messages is disposed in one of a multiplicity of vertically spaced horizontal rows such that identical components of each of said identical text messages are each disposed in a common horizontal row and spaced at a predetermined distance from other components of said common row; and wherein the respective components of each of said identical text messages are sequentially arranged in a spaced vertical manner so as to form the text message as a vertically readable text message; and whereby the text message presenting means is not visually hidden and is immediately visible and comprehensible in its two-dimensional state and is perceived by said viewer to float in space in its perceived three-dimensional state.

2. The tool of claim 1 wherein a number of said components of said identical text messages comprises a plurality of character strings.

3. The tool of claim 1 or 2 wherein at least one of said at-least-one-character-string comprises at least a portion of a word.

4. The tool of claim 3 wherein each of said at-least-one-character-string comprises at least a portion of a word.

5. The tool of claim 4 wherein each of said at-least-one-character-string comprises a word.

6. The tool of claim 3 wherein said at-least-one-of-said-at-least-one-character-string comprises a word.

7. The tool of claim 1 wherein each predetermined distance of said predetermined-distance-from-other-components-of-said-common-row generally changes from horizontal row to horizontal row.

* * * * *